US009305312B2

(12) United States Patent
Kountotsis et al.

(10) Patent No.: US 9,305,312 B2
(45) Date of Patent: Apr. 5, 2016

(54) EXPRESS EASY-PASS CHECKOUT AT GROCERY STORES AND RETAIL ESTABLISHMENTS FOR PREFERRED MEMBERS

(76) Inventors: Theodosios Kountotsis, Melville, NY (US); Agjah Libohova, E. Setauket, NY (US)

( * ) Notice: Subject to any disclaimer, the term of this patent is extended or adjusted under 35 U.S.C. 154(b) by 3 days.

(21) Appl. No.: 13/317,661

(22) Filed: Oct. 25, 2011

(65) Prior Publication Data

US 2013/0103519 A1    Apr. 25, 2013

(51) Int. Cl.

| G06Q 30/06 | (2012.01) |
|---|---|
| G07G 1/00 | (2006.01) |
| G06Q 20/20 | (2012.01) |
| G06Q 20/28 | (2012.01) |
| G06Q 20/32 | (2012.01) |
| G06Q 20/34 | (2012.01) |
| G07F 7/10 | (2006.01) |

(52) U.S. Cl.
CPC .............. *G06Q 30/06* (2013.01); *G06Q 20/204* (2013.01); *G06Q 20/209* (2013.01); *G06Q 20/28* (2013.01); *G06Q 20/3278* (2013.01); *G06Q 20/352* (2013.01); *G07F 7/1008* (2013.01); *G07G 1/009* (2013.01); *G07G 1/0036* (2013.01)

(58) Field of Classification Search
CPC ... G06Q 20/208; G06Q 20/20; G06Q 20/204; G06Q 20/40; G06Q 30/06; G06Q 20/12
USPC .......................................................... 705/23
See application file for complete search history.

(56) References Cited

U.S. PATENT DOCUMENTS

| 7,472,825 B2* | 1/2009 | Fitch et al. .................... 235/379 |
| 8,286,863 B1* | 10/2012 | Brooks ......................... 235/380 |
| 2009/0236200 A1* | 9/2009 | Hallowell et al. ............. 194/215 |
| 2010/0312617 A1* | 12/2010 | Cowen ............................. 705/13 |
| 2011/0246284 A1* | 10/2011 | Chaikin et al. ............. 705/14.38 |
| 2012/0203572 A1* | 8/2012 | Christensen ..................... 705/3 |

OTHER PUBLICATIONS

Financial Crimes Enforcement Network; Amendment to the Bank Secrecy Act Regulations—Definitions and Other Regulations Relating to Prepaid Access. Jun. 28, 2010. The Federal Register.*

* cited by examiner

*Primary Examiner* — Ryan Zeender
*Assistant Examiner* — Fawaad Haider
(74) *Attorney, Agent, or Firm* — Theodosios Kountotsis

(57) ABSTRACT

A grocery store or retail establishment easy-pass (E-Z) lane system for enabling express non-contact payment of a plurality of items is presented including an E-Z pass express checkout lane having at least a scanner for scanning the plurality of items and provided exclusively to preferred members pre-registered with the grocery store or retail establishment. The system includes an RFID antenna positioned about the E-Z pass express checkout lane for communicating with an RFID transponder issued to a preferred member when the RFID transponder is in close proximity to the RFID antenna. The E-Z pass checkout lane is activated thereafter for use by the preferred member for express checkout without the preferred member furnishing direct payment at the E-Z pass express checkout lane via a personal payment account that is separate and distinct from a prepaid vendor-established and maintained purchasing account.

20 Claims, 9 Drawing Sheets

EXPRESS EASY-PASS CHECKOUT AT GROCERY STORES AND RETAIL ESTABLISHMENTS FOR PREFERRED MEMBERS

BACKGROUND

1. Field of the Related Art

The present disclosure relates to purchasing systems, and more particularly, but not exclusively, to expedited purchasing systems positioned on or about a point-of-sale (POS) express checkout lane at a grocery store or retail establishment or combination thereof, and activated by the proximity of a transponder for checkout and payment without the need for cash, credit cards, debit cards, and/or checks at the POS express checkout lane.

2. Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Therefore, unless otherwise indicated herein, what is described in this section is not prior art to the description and claims in this application and is not admitted to be prior art by inclusion in this section.

Grocery stores and retail establishments are trying to become more efficient by applying different and innovative operating methods that help to increase their business's financial condition. One of the constantly pursued goals is the reduction of a customer's waiting time in a checkout line. Being able to speed up the flow of customers through a checkout station, or to reduce cost of a checkout transaction, is critical to the success of a grocery store and/or retail business.

Today, bar code readers are commonly used in commercial and retail environments. In a retail checkout transaction, the consumer presents all the items the consumer wishes to purchase to the cashier at a checkout register. The cashier scans each item in the order in which it is presented to him/her. The transaction is completed once all the items have been scanned, all the coupons have been accepted, the total costs have been calculated, and the consumer has paid for the items. The sequential presentation to a cashier of each individual purchase still takes a long time and creates long lines for customers waiting to pay for their purchases. This may cause bottlenecks at the checkout stations, reduce throughput, make customers unhappy, and affect the financial condition of a retail establishment and/or grocery store.

Self-service checkout or "self-checkout" is another way of conducting a checkout transaction and is a rapidly growing application in the retail and grocery store environments. In a self-checkout system, each customer, rather than the cashier, scans the bar codes on the items the customer is purchasing. However, such self-checkout systems also cause bottlenecks as consumers slowly attempt to scan the items and decide on a payment method, as well as locate coupons.

Additionally, at the majority of retail establishments that sell petroleum, food, general merchandise, and other consumer products and services, a variety of traditional forms of payment are accepted, including cash, check, credit card, and debit card payment. Unfortunately, there are security and handling costs, fees, charges, and losses associated with each of these forms of payment, not to mention bottlenecks created by the slow payers.

For example, where cash is an accepted form of payment, associated costs and losses normally include the cost of the cashier being hired, trained, and supervised; accepting cash; giving back change (including too much change); pocketing money; and end-of-shift or other audits. In addition, attendants who accept cash may worry about cash shortages and may operate under the threat of being fired for such shortages.

Credit and debit card payments include various costs. For instance, costs to the vendor include cashier costs, capital outlays for equipment and software, chargeback fees, card network fees, and rejected or bad card (e.g., Visa®, MasterCard®, etc.) fees.

The acceptance of checks includes many similar costs and fees, as are associated with cash, as well as additional costs and fees. For instance, additional fees associated with accepting checks include third party check verification and guarantee fees, losses due to insufficient funds, collection costs (e.g., administrative, managerial and legal), cost of attendants accepting checks, inconvenience of slow lines due to customers preparing checks at the checkout stand, and adding check amounts for deposit slips.

Therefore, in general, consumers have too many devices (e.g., phones, personal data assistants (PDAs), keys, and wallets), too many cards, and too many devices/cards to present at a point-of-sale (POS). Consumers spend too much time in checkout lines waiting for their payment to process or the payment processing ahead of them in line. Consumers' desire simpler, faster, more convenient, and more flexible methods of payment and access to their loyalty points, rewards, and/or coupons.

Accordingly, what would be advantageous are systems, methods, and computer program products that would further reduce or eliminate the monetary overhead associated with the acceptance of traditional payment methods, allow for the payment of multiple purchases at a time, and/or consolidate purchasing information into a manageable and convenient format for record keeping purposes. Therefore, there is a need for a system and method for quickly paying for items without directly accessing one's personal bank account during every single transaction, and without paying with cash or check or credit.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present disclosure provides for an expedited purchasing system. The expedited purchasing system includes a first communication device fixedly positioned on or about a point-of-sale (POS) checkout lane of at least one grocery store or retail establishment or a combination thereof and a second communication device being a portable device provided to a select number of preferred members, the second communication device associated with unique identification information including at least an identification number and a prepaid vendor-established and maintained purchasing account. After the second communication device is within a point-of-entry (POE) zone and verified as an authorized device, the POS checkout lane is activated thereafter, to permit at least one item of a plurality of items to be scanned by a scanner associated with the POS checkout lane to enable express checkout of the at least one item purchased. Payment is automatically debited from the prepaid vendor-established and maintained purchasing account indirectly associated with a preferred member's personal account.

In one exemplary embodiment, the first communication device is a Radio Frequency Identification Device (RFID) antenna and the second communication device is an RFID transponder. The express checkout is enabled without presentation of cash, credit card, debit card, or check at the POS checkout lane by the preferred member.

In another exemplary embodiment, boundaries of the POE zone are established by one or more characteristics of the first communication device.

In yet another exemplary embodiment, the POS checkout lane is configured to debit a monetary amount from the prepaid vendor-established and maintained purchasing account, the monetary amount debited associated with the at least one of item purchased by the preferred member.

In yet another exemplary embodiment, the POS checkout lane or the second communication device is configured to indicate at least a remaining balance of the prepaid vendor-established and maintained purchasing account.

Additionally, when a monetary amount of the prepaid vendor-established and maintained purchasing account reaches a predetermined threshold, the prepaid vendor-established and maintained purchasing account is automatically replenished with a set amount of funds previously indicated by the preferred member.

In yet another exemplary embodiment, information related to the at least one item scanned at the POS checkout lane is recorded and relayed to a local or remote storage unit.

In another exemplary embodiment, previous rewards, discounts and loyalty points are automatically applied to the purchase of the at least one item and additional rewards, discounts, and loyalty points are applied to the identification number of the second communication device for future redemption.

In yet another exemplary embodiment, the second communication device is a mobile device incorporating an RFID transponder, the mobile device configured to at least record transactions of instances of purchase.

Moreover, an electronic receipt of transactions of instances of purchase is transmitted to the RFID transponder incorporated with the mobile device at a time of purchase, such that the RFID transponder is configured to transmit the electronic receipt to a computing device.

In the exemplary embodiments of the present disclosure, the POS checkout lane exclusively accepts only one form of payment initiated from the second communication device.

The present disclosure also provides a method of purchasing at least one item. The method includes the steps of issuing a first communication device to a select number of preferred members; establishing a prepaid vendor-established and maintained purchasing account associated with the first communication device issued to a preferred member of the number of preferred members; establishing wireless communication between the first communication device and a second communication device when the first and second communications devices are in proximity to each other, the second communication device fixedly positioned on or about a POS checkout lane of at least one grocery store or retail establishment or combination thereof; activating the POS checkout lane after verification and authorization of the wireless communication; permitting the at least one item of a plurality of items to be scanned by a scanner at the POS checkout lane without presentation of cash, credit card, debit card or check by the preferred member to enable expedited checkout; and automatically debiting payment from the prepaid vendor-established and maintained purchasing account which is indirectly associated with a preferred member's personal account.

The method further includes the step of debiting a monetary amount from the prepaid vendor-established and maintained purchasing account associated with the at least one item purchased by the preferred member.

The method further includes the step of indicating a remaining balance of the prepaid vendor-established and maintained purchasing account at the POS checkout lane or at the first communication device.

The method further includes the step of collecting information related to the at least one item purchased to enable the at least one grocery store or retail establishment to provide future discounts, rewards, and loyalty points to the preferred member.

The method further includes the step of recording and relaying the information collected to a local or remote storage unit.

The method further includes the step of automatically replenishing the prepaid vendor-established and maintained purchasing account when a monetary amount of the prepaid vendor-established and maintained purchasing account reaches a predetermined threshold, replenishing occurring with a set amount of funds previously indicated by the preferred member.

The method further includes the steps of automatically applying previous rewards, discounts and loyalty points to the purchase of the at least one item and applying additional rewards, discounts, and loyalty points to the identification number of the second communication device for future redemption.

The method also includes the step of exclusively accepting only one form of payment at the POS checkout lane that is initiated from the second communication device.

The present disclosure also provides for a system for authorizing transponder-enabled transactions. The system includes a communication link between (i) an RFID antenna positioned on or about a POS checkout lane of at least one grocery store or retail establishment or combination thereof and (ii) an RFID transponder; and a prepaid vendor-established and maintained purchasing account periodically funded by a preferred member of the at least one retail or grocery establishment. After the communication link is activated when the RFID transponder is located within a POE zone, the POS checkout lane is configured to be accessible thereafter, to the preferred member for scanning a plurality of items for express checkout without presentation of cash, credit card, debit card or check payments at a time of purchase by the preferred member. Previous rewards, discounts and loyalty points are automatically applied at the time of purchase of the at least one item. Additional rewards, discounts, and loyalty points are applied to the identification number of the second communication device for future redemption. Payment is automatically debited from the prepaid vendor-established and maintained purchasing account indirectly associated with a preferred member's personal account.

The present disclosure also provides for a grocery store or retail establishment easy-pass (E-Z) lane system for enabling express non-contact payment of a plurality of items. The E-Z pass lane system includes an E-Z pass express checkout lane including at least a scanner for scanning the plurality of items, the E-Z pass express checkout lane provided exclusively to a select number of preferred members pre-registered with at least one grocery store or retail establishment or combination thereof and an RFID antenna positioned about the E-Z pass express checkout lane for communicating with an RFID transponder issued to a preferred member of the select number of preferred members after the RFID transponder is authenticated and verified, and determined to be in close proximity to the RFID antenna. The E-Z pass checkout lane is activated thereafter for use by the preferred member for express checkout without the preferred member furnishing direct payment at the E-Z pass express checkout lane via a personal payment account that is separate and distinct from a prepaid vendor-established and maintained purchasing account.

The pre-registering of a preferred member of the number of preferred members involves at least associating the prepaid vendor-established and maintained purchasing account with the RFID transponder.

In one exemplary embodiment, when a monetary amount of the prepaid vendor-established and maintained purchasing account reaches a predetermined threshold, the prepaid vendor-established and maintained purchasing account is automatically replenished with a set amount of funds previously indicated by the preferred member and transferred from the payment account that is separate and distinct from the at least one grocery store or retail establishment.

In another exemplary embodiment, the RFID transponder is incorporated with a mobile device. Additionally, an electronic receipt of transactions of instances of purchase is transmitted to the RFID transponder incorporated with the mobile device at a time of purchase, such that the RFID transponder is configured to transmit the electronic receipt to a computing device.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

Various embodiments of the present disclosure will be described herein below with reference to the figures wherein.

Figure 1:
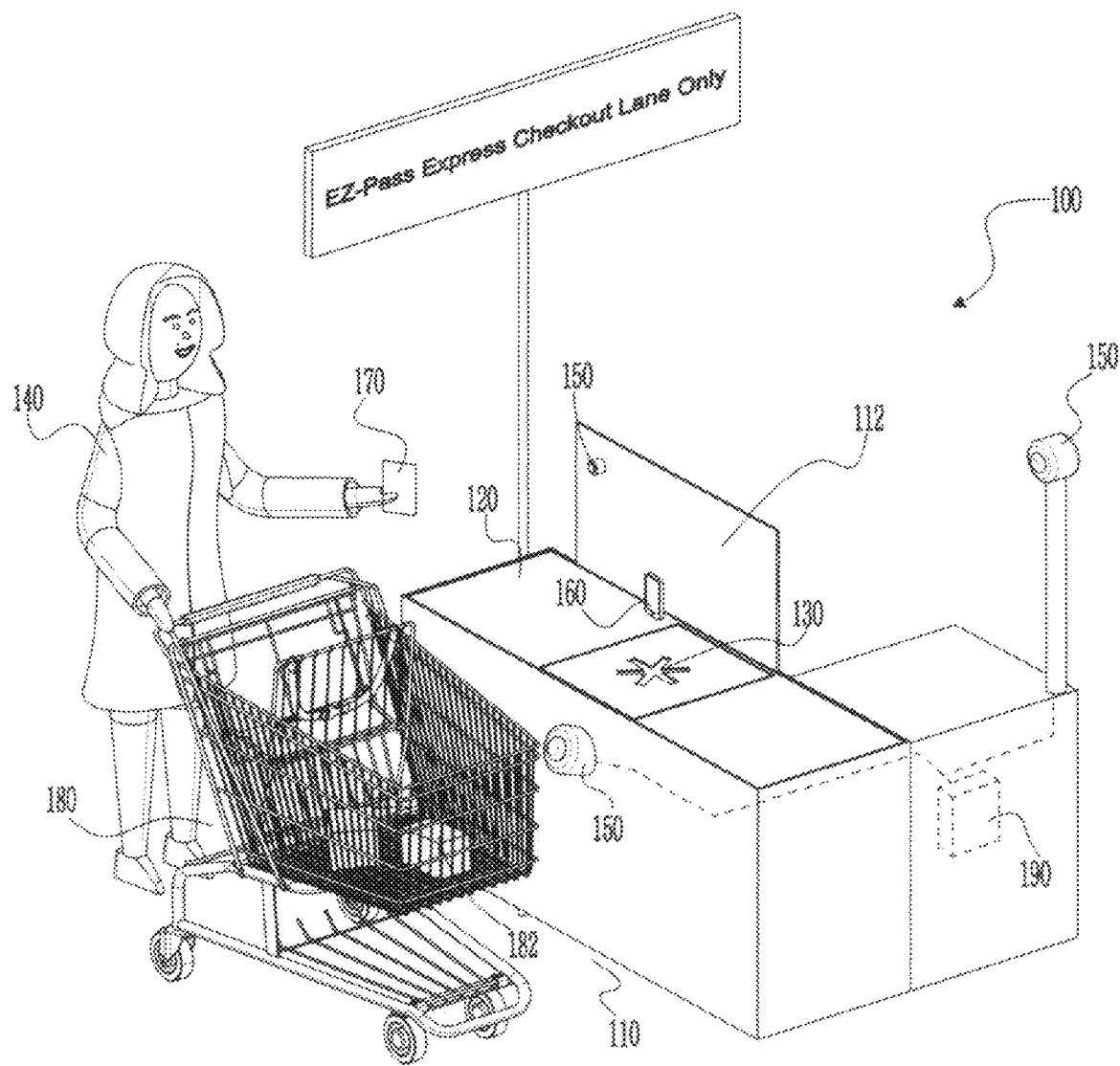
FIG. 1 is a perspective view of a checkout lane including at least one RFID antenna activated by an RFID transponder within a POE zone, in accordance with the present disclosure.

The figures depict preferred embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

Although the present disclosure will be described in terms of a specific embodiment, it will be readily apparent to those skilled in this art that various modifications, rearrangements and substitutions may be made without departing from the spirit of the present disclosure. The scope of the present disclosure is defined by the claims appended hereto.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "one embodiment," "an embodiment," and similar language throughout this specification may, but do not necessarily, all refer to the same embodiment, different embodiments, or component parts of the same or different illustrated disclosure. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the present disclosure as claimed. The independent embodiments are considered to be able to be combined in whole or in part one with another as the claims and/or art may direct, either directly or indirectly, implicitly or explicitly.

Moreover, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Unless otherwise indicated, all numbers expressing quantities and conditions, and so forth used in the specification and claims are to be understood as being modified in all instances by the term "about." The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof. The term "comprise," "comprises," "comprised," or "comprising," if and when used in this document, should be interpreted non-exclusively, i.e., should be interpreted to mean "consisting of or including."

The present disclosure pertains to an expedited purchasing system initiated or activated by an RFID transponder in proximity to an RFID antenna, the RFID antenna located within a grocery store and/or retail establishment. The RFID transponder is associated with a prepaid vendor-established and maintained purchasing account. After verification of the transponder at the POS express checkout lane of the grocery store and/or retail establishment, the user is permitted to scan items to be purchased and pay with the prepaid vendor-established and maintained purchasing account. The prepaid vendor-established and maintained purchasing account is not the user's personal checking account or savings account or credit card or debit card or check. The prepaid vendor-established and maintained purchasing account is indirectly associated with a user's personal checking account or savings account or credit card or debit card. The prepaid vendor-established and maintained purchasing account is owned or operated or managed or controlled by a grocery store and/or retail establishment. The prepaid vendor-established and maintained purchasing account is prefunded by a preferred member. In other words, the monetary funds must be paid to the grocery store and/or retail establishment before the issuing of such an account to the preferred member. The prepaid vendor-established and maintained purchasing account is associated with a transponder or tag or smart tag for allowing the preferred member to access, in an exclusive manner, a specific and unique express checkout lane designated at a corresponding grocery store and/or retail establishment or combination thereof. The express checkout lane is an exclusive lane for VIP or preferred members that have been pre-registered.

It is another object of the present disclosure to provide an E-Z pass purchasing system and method where an E-Z pass checkout lane is provided to preferred members of a grocery store and/or retail establishment. The E-Z pass checkout lane only includes an RFID antenna for sensing an RFID transponder (i.e., only one type of available payment transaction). There is no other payment option available at the E-Z pass POS express checkout lane. In other words, there is no swipe mechanism or keypad mechanism available to receive credit cards or debit cards. Additionally, there is no slot mechanism for receiving cash or a check. Only pre-registered users, who have first provided funds, and who have been issued an RFID transponder communicating or associated with a prepaid vendor-established and maintained purchasing account may access and use the E-Z pass express checkout lanes. Therefore, the user, or preferred member, may check out of the grocery store and/or retail establishment without furnishing direct payment at the E-Z pass express checkout lane via a personal payment account (e.g., banking account or credit card account) that is separate and distinct from the prepaid vendor-established and maintained purchasing account.

The exemplary embodiments of the present disclosure significantly differ in several aspects from the Exxon® Speedpass™ system. In the Speedpass™ system, the items are first scanned at a conventional register. A user then waves the transponder at the reader. An authorization takes place by linking the transponder to a personal user credit card or debit card or checking account or savings account that the user directly accesses and controls and manages, for each purchasing transaction. In contrast, in the exemplary embodiments of the present disclosure, the user must first scan and verify (or authorize) the transponder (before the items are scanned). Then, after authorization has taken place to use the express checkout lane, one or more items may be scanned. The payment is deducted, not from a personal user account, but from a prepaid vendor-established and maintained purchasing account. The vendor-established and maintained purchasing account is an account payment established by the grocery store and/or retail establishment. The user deposits money or monetary funds or funds into such an account at a prior point in time (pre-registration). Additionally, the POS checkout lane does not include any other type of conventional payment means (cash, credit, debit or check). Thus, there is only one exclusive method of payment (i.e., via the transponder linked only to the paid vendor-established and maintained purchasing account).

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is intended to cover all modifications, equivalents, and alternatives falling within the spirit and scope of the present disclosure as defined by the claims. Like numbers refer to like elements throughout the description of the figures.

Prior to describing the present disclosure in further detail, it will first be helpful to define various terms that will be used throughout the following discussion. For example:

The term "grocery store" may be defined at least as a store established primarily for the retailing of food and/or a marketplace where groceries are sold and/or a food service establishment selling commercially prepackaged foods and/or beverages.

Terms that are synonymous with the term "grocery store" may be mom-and-pop store, bodega, convenience store, corner store, food mart, marketplace, market, food store, retail food store, supermarket, deli, delicatessen, chain store, department store, general store, drug store, discount store, and or any type of retail establishment that sells "items" or "products" as defined below.

The term "supermarket" may be defined at least as a large self-service grocery store selling groceries and dairy products and household goods and/or a self-service store offering a wide variety of food and household merchandise, organized into departments. A "supermarket" may be larger in size and have a wider selection than a traditional grocery store and it may be smaller than a hypermarket or superstore. A "supermarket" may also be defined as a complete market offering food and nonfood items, including some partial service departments. The terms "supermarket" and "grocery store" may be used interchangeably throughout the specification.

The term "retail establishment" may refer to at least a store, a market, a supermarket, a hypermarket, a business establishment, a chain store, a convenience store, a discount store, a drug store, a grocery store, a mart, an outlet, a shop, a shopping center, department store, warehouse store, variety store, specialty store, general store, a vending machine, kiosks, an operation, a venture or any establishment that sells goods, or items or products of any sort related to any type of industry, or to any type of service provider, including, but not limited to, clothing, shoes, apparel, appliances, electronics, furniture, sporting goods. The terms "grocery store" and "retail establishment" may also be used interchangeably throughout the specification.

The term "items" may at least refer to goods, products, merchandise, commodities, food, produce, drinks, beverages, articles, objects, materials, alcohol, cleaning products, medicine, electrical products, greeting cards, houseware products, personal hygiene products, novelties, etc. An item may be anything that is sold in a "grocery store" and/or "supermarket" as defined above, and any of the synonyms used to describe a "grocery store" and/or "supermarket." The term "item" may be used interchangeably with the term "product."

The term "storage" may at least refer to data storage. "Data storage" may refer to any article or material (e.g., a hard disk) from which information may be capable of being reproduced, with or without the aid of any other article or device. "Data storage" may refer to the holding of data in an electromagnetic form for access by a computer processor. Primary storage may be data in random access memory (RAM) and other "built-in" devices. Secondary storage may be data on hard disk, tapes, and other external devices. "Data storage" may also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "mobile device" may refer at least to one or more personal computers (PCs), a standalone printer, a standalone scanner, a mobile phone, a cell phone, a Smart Phone, and iPhone®, an MP3 player, audio electronics, video electronics, portable electronics, an e-book reader (such as the Nook® or Kindle® or, Sony Reader®), GPS systems, televisions, recording and/or reproducing media (such as CDs, DVDs, camcorders, cameras, etc.) or any other type of consumer or non-consumer analog and/or digital electronics. Such consumer and/or non-consumer electronics may apply at least in any type of entertainment, communications, home, and/or office capacity. Thus, the term "mobile device" may refer to any type of electronics suitable for use with a circuit board and intended to be used by a plurality of individuals for a variety of purposes. The electronic device may be any type of computing and/or processing device. The term "mobile device" may be associated with or cooperating with or have incorporated therein a transponder.

The term "processing" may at least refer to determining the elements or essential features or functions or processes of one or more transponder recognition, collection, and analysis systems for computational processing. The term "process" may further refer to tracking data and/or collecting data and/or manipulating data and/or examining data and/or updating data on a real-time basis in an automatic manner and/or a selective manner and/or manual manner (continuously or periodically).

The terms "Internet" or "network" as used herein, may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein.

The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Reference will now be made in detail to embodiments of the present disclosure. While certain embodiments of the present disclosure will be described, it will be understood that it is not intended to limit the embodiments of the present disclosure to those described embodiments. To the contrary, reference to embodiments of the present disclosure is intended to cover alternatives, modifications, and equivalents as may be included within the spirit and scope of the embodiments of the present disclosure as defined by the appended claims.

Embodiments will be described below while referencing the accompanying figures. The accompanying figures are merely examples and are not intended to limit the scope of the present disclosure.

With reference to FIG. 1, there is presented a perspective view of an express checkout lane including at least one RFID antenna activated by an RFID transponder within a POE zone, in accordance with the present disclosure.

The expedited E-Z Pass purchasing system 100 includes a conveyor belt 120 leading to a scanning mechanism 130. A user 140 is shown pushing a shopping cart 180 including a plurality of items 182. The expedited E-Z Pass purchasing system 100 includes one or more RFID antennas 150. For example, one RFID antenna 150 may be placed or positioned or connected to a middle or lower, central portion of the express checkout lane 110 by the shopping cart 180. However, the RFID antenna 150 may be placed at the distal end of the express checkout lane 110. Alternately, the RFID antenna 150 may be placed adjacent the express checkout lane 110 on a wall structure 112. The E-Z Pass purchasing system 100 may fully function with one RFID antenna 150. One skilled in the art may contemplate using a number of different RFID antennas 150 and antenna configurations to create a desired point-of-entry (POE) zone.

One or more of the RFID antennas 150 may be connected to a local storage unit 190 or to a remote storage unit or database or server (not shown). The local storage unit 190 (or the remote storage unit) may communicate with a database or a server or other processing means to analyze the data collected. The term "analyze" may at least refer to determining the elements or essential features or functions or processes of one or more RFID recognition, collection, and analysis systems for computational processing. The term "analyze" may further refer to tracking data and/or collecting data and/or manipulating data and/or examining data and/or updating data on a real-time basis in an automatic manner and/or a selective manner and/or manual manner (continuously or periodically).

The user 140 is permitted to use the expedited E-Z Pass purchasing system 100 only if the user has a transponder or tag or smart tag corresponding to a prepaid vendor-established and maintained purchasing account. For example, the user may have a transponder 170, which is a standalone device. However, the user 140 may also have a mobile device 160 incorporating a transponder associated with a prepaid vendor-established and maintained purchasing account. The prepaid vendor-established and maintained purchasing account will be described below in detail. As such, when a communication is established between at least one RFID antenna 150 and the RFID transponder 160 or 170, and authorization has been verified, the express lane is then or subsequently activated to permit the checkout clerk to scan one or more items 182. The user 140 need not provide any type of credit card or debit card information to the clerk. The user 140 need not use any cash or check for payment to the clerk. The user merely enters a POE zone where the RFID transponder 160 or 170 is recognized and verified by the RFID antenna 150, communicates with the RFID antenna 150, and the E-Z Pass express checkout lane 110 is automatically activated to permit the scanning of items 182 by the checkout clerk. The transponder 160 or 170 may be a smart tag, and is described further in detail below with reference to FIG. 3.

By being in "communication," what is described may be that a signal may travel to/from one component of the present disclosure to another. The components may be directly connected to each other or may be connected through one or more other devices or components. The various coupling components for the devices may include but are not limited to the Internet, a wireless network, a conventional wire cable, an optical cable or connection through air, water, or any other medium that conducts signals, and any other coupling device or medium.

Additionally, the reader/antennas 150 may be capable of detecting RFID tag identification information and transmitting the RFID tag identification information along with the charge to the remote computers or to a local storage unit 190 (data storage, as defined herein), which may then transmit the information to the host computer or database or server to charge the associated prefunded account for that RFID tag, which is associated with a prepaid vendor-established and maintained purchasing account, described below. Alternatively, remote computers or computing means may access the host computer for RFID tag identification information, and identify the prepaid vendor-established and maintained purchasing account (i.e., prefunded account) before transmission of the charge information to the host computer or database or server.

The prepaid vendor-established and maintained purchasing account is distinguished from a regular personal account. In conventional systems, a user deducts funds directly from his/her personal account (e.g., an account associated with a bank; checking account, savings account, etc.). In contrast, the prepaid vendor-established and maintained purchasing account is an account where the user first pays the vendor directly (e.g., grocery store or retail establishment). The vendor takes the money and establishes an account associated with the user. The vendor then provides the user with an RFID tag associated with or corresponding to the prepaid vendor-established and maintained purchasing account. The vendor maintains the prepaid vendor-established and maintained purchasing account. Therefore, purchases are not directly related to a personal account, which is associated with a separate and distinct banking entity or credit entity. Purchases are only indirectly related to a personal account. The prepaid money or funds provided to the vendor may be invested by the vendor. This enables the vendor to provide the user with automatic discounts and/or rewards and/or loyalty points or other promotions.

Therefore, the users of these RFID tags generally associate a prefunded account to serve as a source of funds to pay for charges made with their RFID tags, where the prefunded account balance is referred to as the "float." These prefunded accounts are maintained by a vendor system operator or service provider (defined below) (e.g., associated with the retail establishment or grocery store), who invests the account balances and makes a profit off this "float." The user may automatically replenish the prefunded account by instructing the system to charge additional "float" to an individual checking, savings, or credit card account or other source of funds that is associated with the RFID tag when the prefunded account balance reaches a low limit or threshold, or the user may manually replenish the prefunded account balance at the grocery store or retail establishment (e.g., at a kiosk or vending machine). As such, since the grocery store and/or retail establishment is prepaid a certain amount each cycle, such prepaid amount is a "float," which may be invested. Such investment vehicle may allow the grocery store and/or retail establishment to provide automatic incentives, rewards, loyalty points, and/or discounts to the user 140 directly at the POS express checkout lane 110, each time such lane 110 is activated upon verification, as discussed further below.

The following examples are non-limiting examples of how the E-Z Pass purchasing system 100 may operate. For instance, a customer may consistently shop at a grocery store, such as Waldbaum's™, Kroger™, Meijer™, Costco™, Safeway™, Sam's Club™, BJ's Wholesale Club™, Wal-Mart™, Kmart Super Centers™, Whole Foods Markets™, SuperValu™, A&P Supermarkets™, Pathmark™, Piggly Wiggly™, Delhaize America™, etc. The customer may be able to visit the grocery store only once a week, for example, every Saturday. However, Saturdays' are quite busy for the supermarket as hundreds of other consumers also shop during this specific day. As such, the payment lines at the grocery store may be long and checkout may take an excessive amount of time. In order to avoid such a situation, the consumer may apply for preferred member status with his/her choice of supermarket. If approved, by the grocery store or supermarket of choice, the user becomes a preferred member and pays a set amount of money, for example, every month (or any other cycle). The consumer, in the instant case, may decide to pay $500 on the first of every month for groceries directly to the grocery store or supermarket of choice. Once the consumer pays such preset or pre-established monetary amount, a prepaid vendor-established and maintained purchasing account is activated. The prepaid vendor-established and maintained purchasing account is then associated with or corresponds to an RFID tag or transponder provided to the consumer.

From this point on, when the consumer embarks on a grocery store visit to purchase items, the consumer is permitted to use an E-Z Pass express checkout lane that may only be activated by preferred members having a prepaid vendor-established and maintained purchasing account associated with or corresponding to an RFID tag or transponder. The consumer obtains a shopping cart, fills the shopping cart with any number of items (or products) and proceeds to the E-Z Pass express checkout lane. The consumer then exhibits or displays the RFID transponder. The RFID antenna positioned on or about the E-Z Pass checkout lane picks up or recognizes the RFID transponder, when the RFID transponder is within the POE zone. The RFID antenna verifies that the consumer has acquired preferred member status. After such verification first takes place, instantly and automatically and in real-time, the E-Z Pass checkout lane is automatically activated to receive the items placed on the conveyor belt (subsequent activation of express checkout lane). No cash or credit card or debit or check is presented to the checkout clerk. The items are scanned by the checkout clerk, put in bags, and the user is free to leave the store. The total balance of the items is automatically deducted from the amount initially deposited in the prepaid vendor-established and maintained purchasing account. An account balance may also be displayed on the RFID transponder or on some display screen of the E-Z Pass express checkout lane or may be transmitted to any electronic device or mobile device authorized to communicate with the E-Z Pass express checkout lane, as described below with reference to FIG. 2. Therefore, the consumer is enabled to expressly checkout without the hassle of waiting in long lines and indecisive people trying to decide on a payment method, as well the scanning of several coupons.

In another non-limiting example, the E-Z Pass purchasing system 100 may operate at a retail establishment. For instance, a consumer may consistently shop at a retail establishment, such as Macy's®, JC Penny's®, Bloomingdale's®, The Gap®, Ann Taylor®, Nordstrom®, Best Buy®, Sears®, Sephora®, etc. In the instant case, the customer may love to shop at Macy's®. However, such retail establishment gets quite busy as it is popular with many consumers. As in the above example, the consumer applies for preferred member status with Macy's®, Macy's® establishes a prepaid vendor-established and maintained purchasing account with the consumer, provides the consumer with an RFID tag associated with or corresponding to the prepaid vendor-established and maintained purchasing account, the consumer deposits, say $300 month, in the prepaid vendor-established and maintained purchasing account, and the account is ready. The consumer then goes to Macy's®, picks up, for example, a shirt and a pair of pants, goes to the E-Z Pass express checkout lane (which is only authorized for preferred member pre-registered with the prepaid vendor-established and maintained purchasing account), displays the RFID tag, the RFID tag is detected, the consumer is verified as a preferred member, the E-Z Pass express lane is activated, the checkout clerk scans the items, the consumer receives a receipt, and departs Macy's®. No cash or credit card or debit card or check was presented to the clerk. The consumer never interacted directly with his/her savings or checking account (or any other type of personal account linked to his/her personal banking account). Express checkout was performed in a quick and easy manner, without the hassle experienced with conventional checkout lanes. Additionally, non-preferred members or regular customers were prohibited from using such an express lane (due to the lack of preferred status), since such express lane cannot be activated without an issued RFID tag or transponder, thus enabling shorter lines at the POS express checkout lane. Activation of the express checkout lane is based on use of a transponder or tag, not the presence of a user or consumer.

Figure 2:
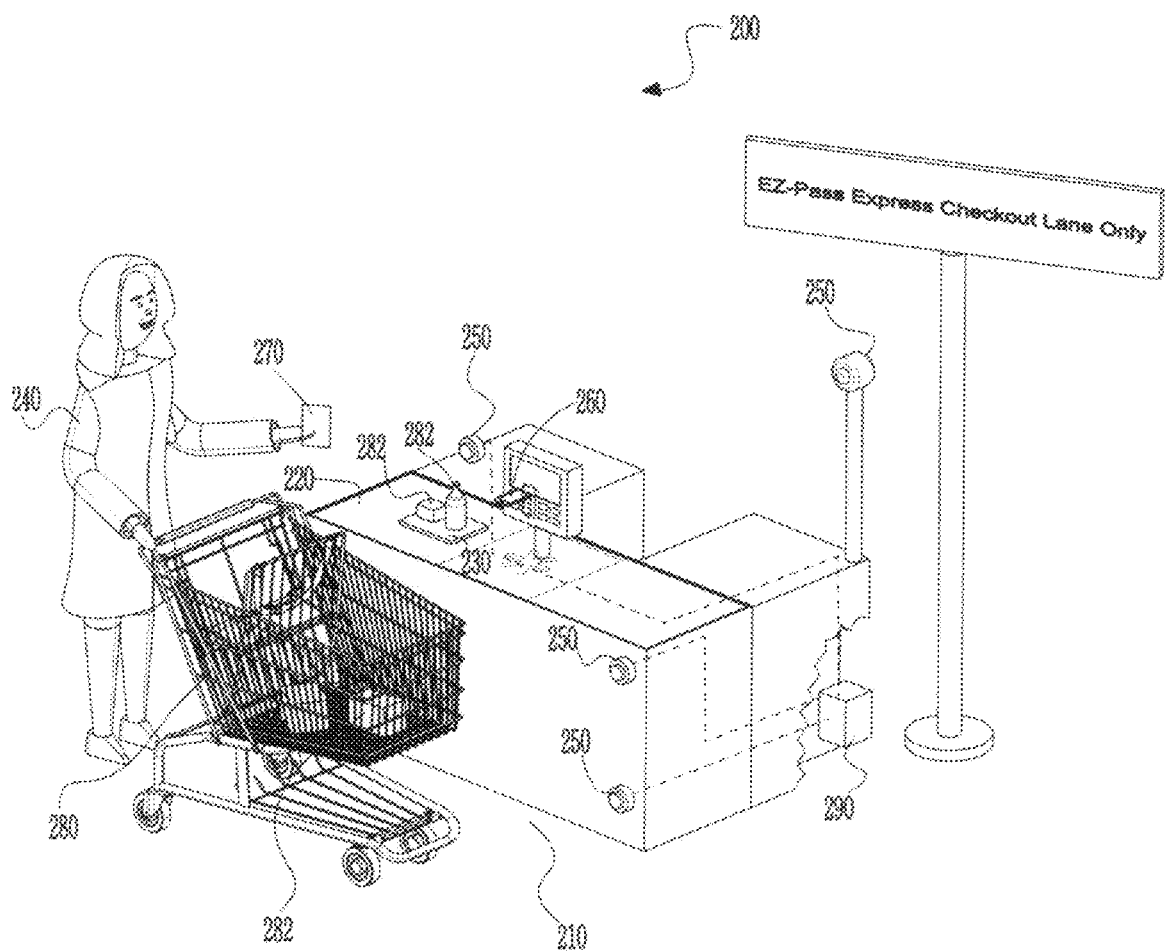
FIG. 2 is a perspective view of a self-service checkout lane including at least one RFID antenna activated by an RFID transponder within a POE zone, in accordance with the present disclosure.

With reference to FIG. 2, there is presented a perspective view of a self-service checkout lane including at least one RFID antenna activated by an RFID transponder within a POE zone, in accordance with the present disclosure.

The expedited E-Z Pass purchasing system 200 is similar to the system 100, described above with reference to FIG. 1. In contrast to the system 100, the expedited E-Z Pass purchasing system 200 is a self-checkout lane.

The expedited E-Z Pass purchasing system 200 includes a conveyor belt 220 leading to a scanning mechanism 230. A user 240 is shown pushing a shopping cart 280 including a plurality of items 282. The expedited E-Z Pass purchasing system 200 includes one or more RFID antennas 250. For example, one RFID antenna 250 may be placed or positioned or connected to an end portion of the express checkout lane 210 by the shopping cart 280. However, the RFID antenna 250 may be placed near the scanning mechanism 230. The E-Z Pass purchasing system 200 may fully function with one RFID antenna 250. One skilled in the art may contemplate using a number of different RFID antennas 250 to create a desired point-of-entry (POE) zone.

One or more of the RFID antennas 250 may be connected to a local storage unit 290 or to a remote storage unit or database or server (not shown). The local storage unit 290 (or the remote storage unit) may communicate with a database or a server or other processing means to analyze the data collected. The term "analyze" may at least refer to determining the elements or essential features or functions or processes of one or more RFID recognition, collection, and analysis systems for computational processing. The term "analyze" may further refer to tracking data and/or collecting data and/or manipulating data and/or examining data and/or updating data on a real-time basis in an automatic manner and/or a selective manner and/or manual manner (continuously or periodically).

The user 240 is permitted to use the expedited E-Z Pass purchasing system 200 only if the user has a transponder corresponding to a prepaid vendor-established and maintained purchasing account. For example, the user may have a transponder 270, which is a standalone device. However, the user 240 may also have a mobile device 260 incorporating a transponder associated with a prepaid vendor-established and maintained purchasing account. As such, when a communication is established between at least one RFID antenna 250 and the RFID transponder 260 or 270, and authorization has been verified, the express lane is then or subsequently activated to permit the user to scan one or more items 282. The user 240 need not provide any type of credit card or debit card information. The user 240 need not use any cash or check for payment. The user merely enters a POE zone where the RFID transponder 260 or 270 is recognized and verified by the RFID antenna 250, communicates with the RFID antenna 250, and the E-Z Pass express checkout lane 210 is automatically activated to permit the scanning of items 282. The transponder 260 or 270 may be a smart tag, and is described further in detail below with reference to FIG. 3.

Additionally, in FIGS. 1 and 2, the presence of an LED and/or LCD readout in the RFID tag 260, 270 may be enabled so that the user may view such information as remaining balance in his or her prepaid vendor-established and maintained purchasing account (prefunded account) or to receive and/or view messages transmitted from the reader/antenna 250. The RFID tag 260, 270 may also have the ability to generate a sound that indicates a successful detection by the reader/antenna 250 or a low prefunded account balance, which might be a theme song associated with the holder of the collective account. The RFID tag may have a communication port to allow it to communicate with other computing devices, such as a mobile device or a PC or other electronic device.

Moreover, in FIGS. 1 and 2 payment is automatically debited from the prepaid vendor-established and maintained purchasing account indirectly associated with a preferred member's personal banking or credit account. Also, the POS checkout lane or the second communication device is configured to indicate at least a remaining balance of the prepaid vendor-established and maintained purchasing account. Furthermore, when a monetary amount of the prepaid vendor-established and maintained purchasing account reaches a predetermined threshold, the prepaid vendor-established and maintained purchasing account is automatically replenished with a set amount of funds previously indicated by the preferred member. In other words, a preferred member may indicate that when the funds of the prepaid vendor-established and maintained purchasing account reaches a low threshold, say $50, the funds may be automatically replenished by charging a credit card or debit card. Alternatively, the preferred member may be contacted, via electronic means (e.g., email, text message, voice message) that the prepaid vendor-established and maintained purchasing account has reaches a low threshold and allow the user to deposit funds either via the Internet or in-person at the store by cash, check, credit or debit (or by using a kiosk or vending machine). It is contemplated that each grocery store and/or retail establishment incorporates a preferred member link on their website to allow for the creation of a prepaid vendor-established and maintained purchasing account, as well as the means to regularly update such prepaid account with a desired or suitable amount of funds.

Moreover, in FIGS. 1 and 2, previous rewards, discounts and loyalty points are automatically may be applied to the purchase of the at least one item and additional rewards, discounts, and loyalty points are applied to the identification number of the second communication device for future redemption. Of course, the preferred member may be permitted to have the option to either instantly apply the coupons, points, and rewards to the current transaction or may be permitted to save such coupons, points, and rewards for application to a future transaction (as described in detail below with reference to FIGS. 7-9). Such determination may be made via a display screen on the RFID transponder or a display screen located at the POS express checkout lane. The preferred member may be asked "Do you want to apply coupons and discounts to this transaction?" The preferred member may click "Yes" or "No." If "No" is selected by the preferred member, then such question may be asked at the next transaction (see FIGS. 7-9).

Figure 3A:
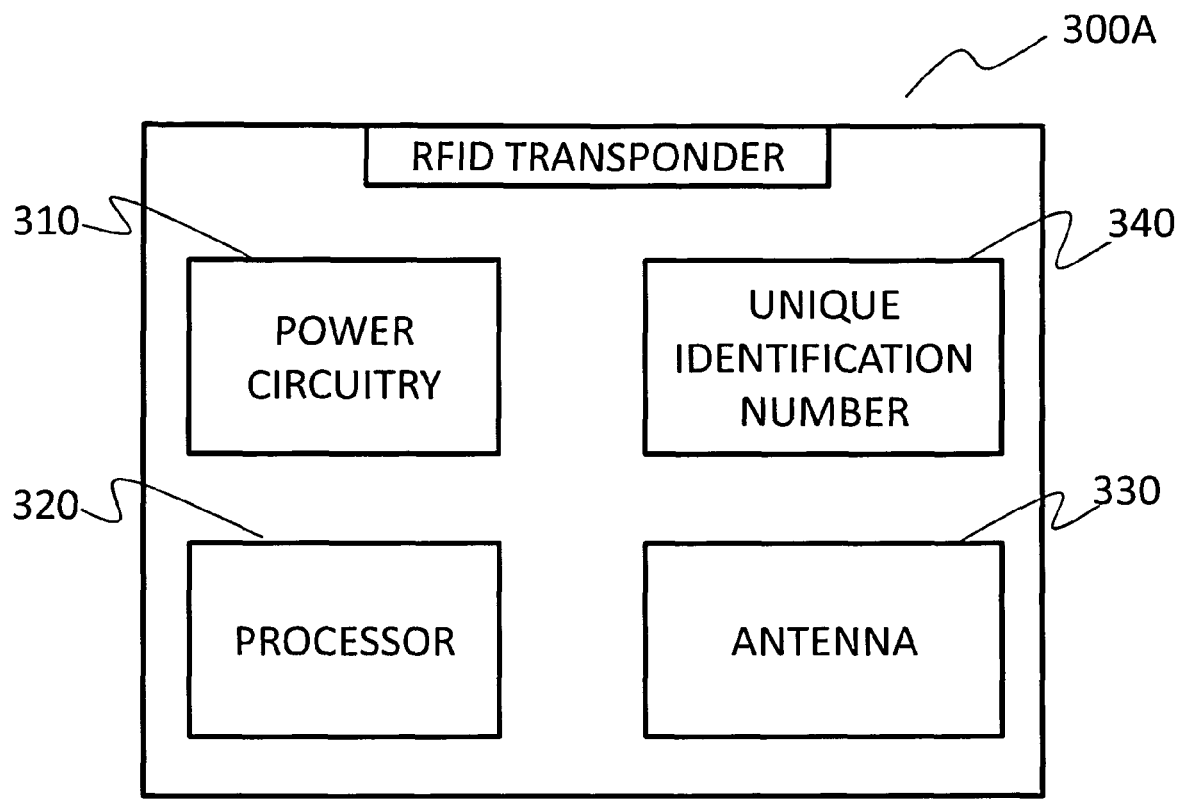
FIG. 3A illustrates an exemplary transponder to be activated by at least one RFID antenna positioned at a grocery store or retail establishment, in accordance with the present disclosure.

With reference to FIG. 3A, there is illustrated an exemplary transponder to be activated by at least one RFID antenna positioned at a grocery store or retail establishment, in accordance with the present disclosure.

The RFID transponder 300A may include power circuitry 310, a processor 320, an internal antenna 330, and a unique identification number 340. One skilled in the art may contemplate incorporating a plurality of other functions into the transponder 300A. For example a display screen (not shown) may be incorporated with the transponder 300A. Additionally, any type of memory unit or module or storage data unit (not shown; as defined herein) may be incorporated with the transponder 300A. The transponder 300A may also include a power means, such as a battery (not shown). RFID transponder 300A may be identified by a unique identification number (e.g., transponder ID). The transponder 300A may be a smart tag. One skilled in the art may contemplate the use of any type of transponder or transponder configuration or the like.

Smart tags are typically utilized for tagging and electronically identifying objects by reading information stored in the electronic memory of the smart tag using contact-less radio-frequency (RF) transmissions. For the present smart tagging system and method, an electronic integrated circuit in the form of a semiconductor chip or processor 320 may be connected to the internal antenna 330 on a substrate to serve as a tag. The semiconductor chip typically includes a processor and an electronic memory for storing information. The microchip includes information that identifies a prepaid vendor-established and maintained purchasing account. Information stored in a smart tag may be read by a suitable smart tag reader and may be read and written to by a suitable reader/writer. The reader or reader/writer and the tag antenna are tuned suitably so that RF energy (electromagnetic fields and electrical signals) may stimulate the tag to emit a signal representative of the information (electronic codes or data) stored in the tag memory. Such contact-less RF tags eliminate the need for an electrical contact or a line-of-sight path for communication with the smart tag. The RFID transponder 300A further includes circuitry 310 for establishing a radio communication between the RFID transponder 300A and the antennas 150, 250 of the expedited E-Z Pass purchasing systems 100, 200.

Moreover, the RFID transponder 300A may be, for example, an active transponder or a passive transponder. Passive transponders do not require a battery to derive power for operation. Passive transponders derive power to operate from the electric field generated by the passive transponder. In addition, passive transponders are long lasting and support multiple frequency ranges. However, active transponders have a battery for deriving power for operation and support only one frequency. One skilled in the art may contemplate using any type of transponder in accordance with desired or suitable applications.

Figure 3B:
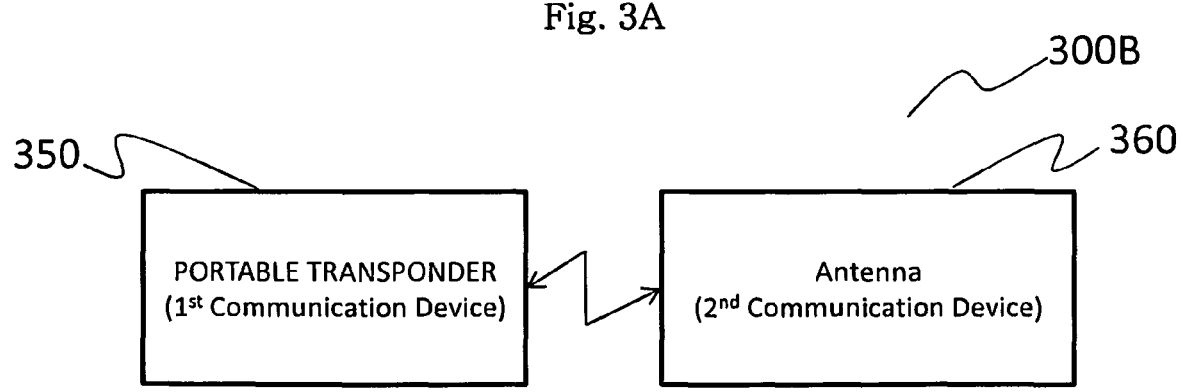
FIG. 3B illustrates the communication between the first communication device and the second communication device, in accordance with the present disclosure.

With reference to FIG. 3B, there is illustrated a communication between the first communication device and the second communication device, in accordance with the present disclosure.

FIG. 3B merely illustrates that there is a communication 300B between a first communication device 350 and a second communication device 360. The first communication device 350 may be a portable RFID transponder, whereas the second communication device 360 may be an antenna positioned on or about a POS express checkout lane at a grocery store or retail establishment.

Figure 4:
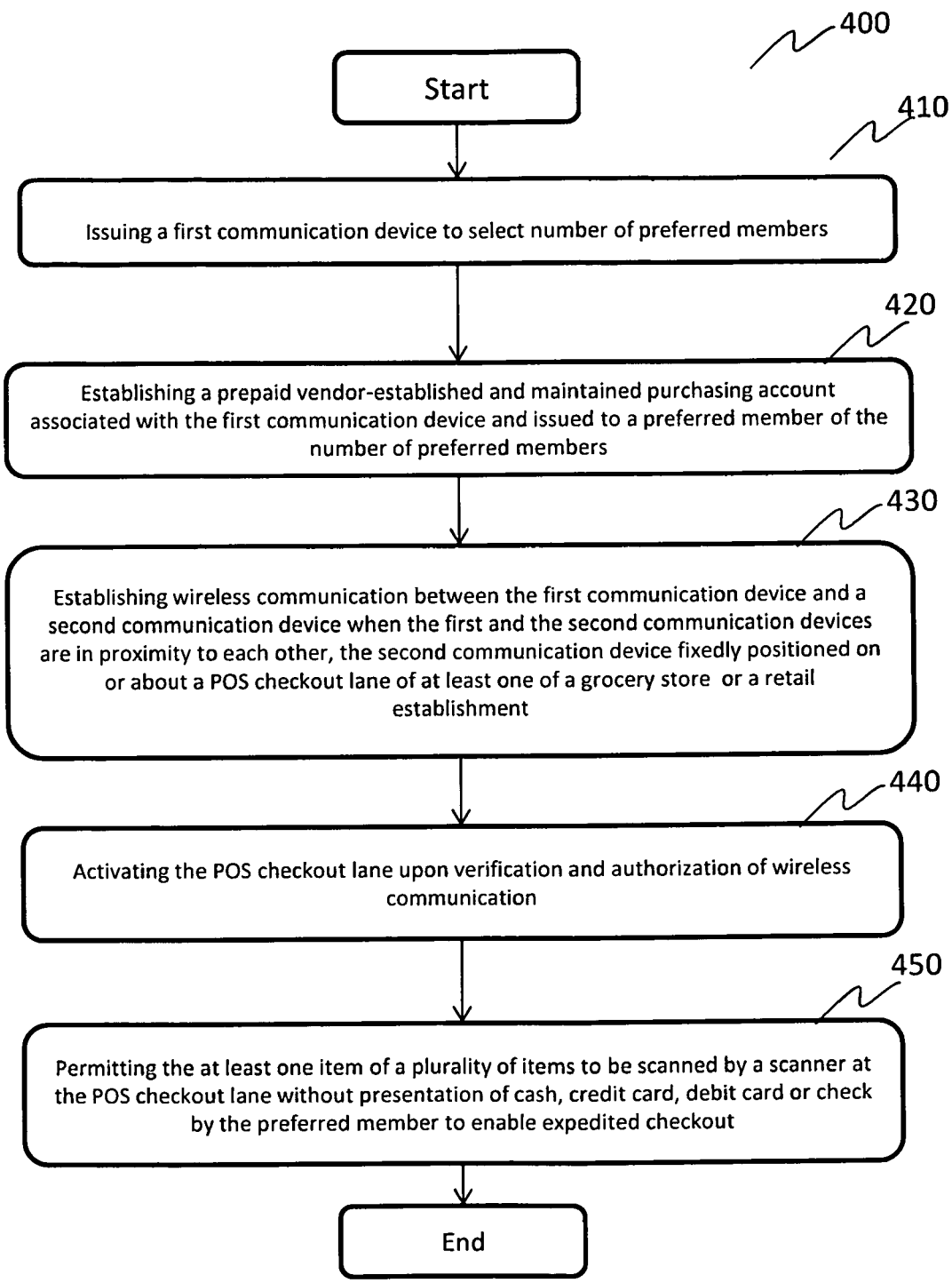
FIG. 4 is a flowchart illustrating activation of a POS checkout lane via a transponder connected to a prepaid vendor-established and maintained purchasing account, in accordance with the present disclosure.

With reference to FIG. 4, there is presented a flowchart illustrating activation of a POS checkout lane via a transponder connected to a prepaid vendor-established and maintained purchasing account, in accordance with an embodiment of the present disclosure.

The flowchart 400 includes the following steps. In step 410, a first communication device is issued to a select number of preferred members. In step 420, a prepaid vendor-established and maintained purchasing account is associated with the first communication device issued to a preferred member of a number of preferred members. In step 430, a wireless communication is established between the first communication device and the second communication device after the first and second communication devices are in proximity to each other, the second communication device fixedly positioned on or about a POS checkout lane of at least one grocery store or retail establishment or combination thereof. In step 440, the POS checkout lane is activated after verification and authorization of the wireless communication has taken place. In step 450, the at least one item of a plurality of items is permitted to be scanned by a scanner at the POS checkout lane without presentation of cash, credit card, debit card or check by the preferred member to enable expedited checkout. The process then ends for the first cycle or first iteration. However, the process may be a continuous iterative process. In other words, the steps of the process may repeat for a number cycles or iterations, where at least the issuing, establishing, activating, and scanning steps are constantly repeated.

Figure 5:
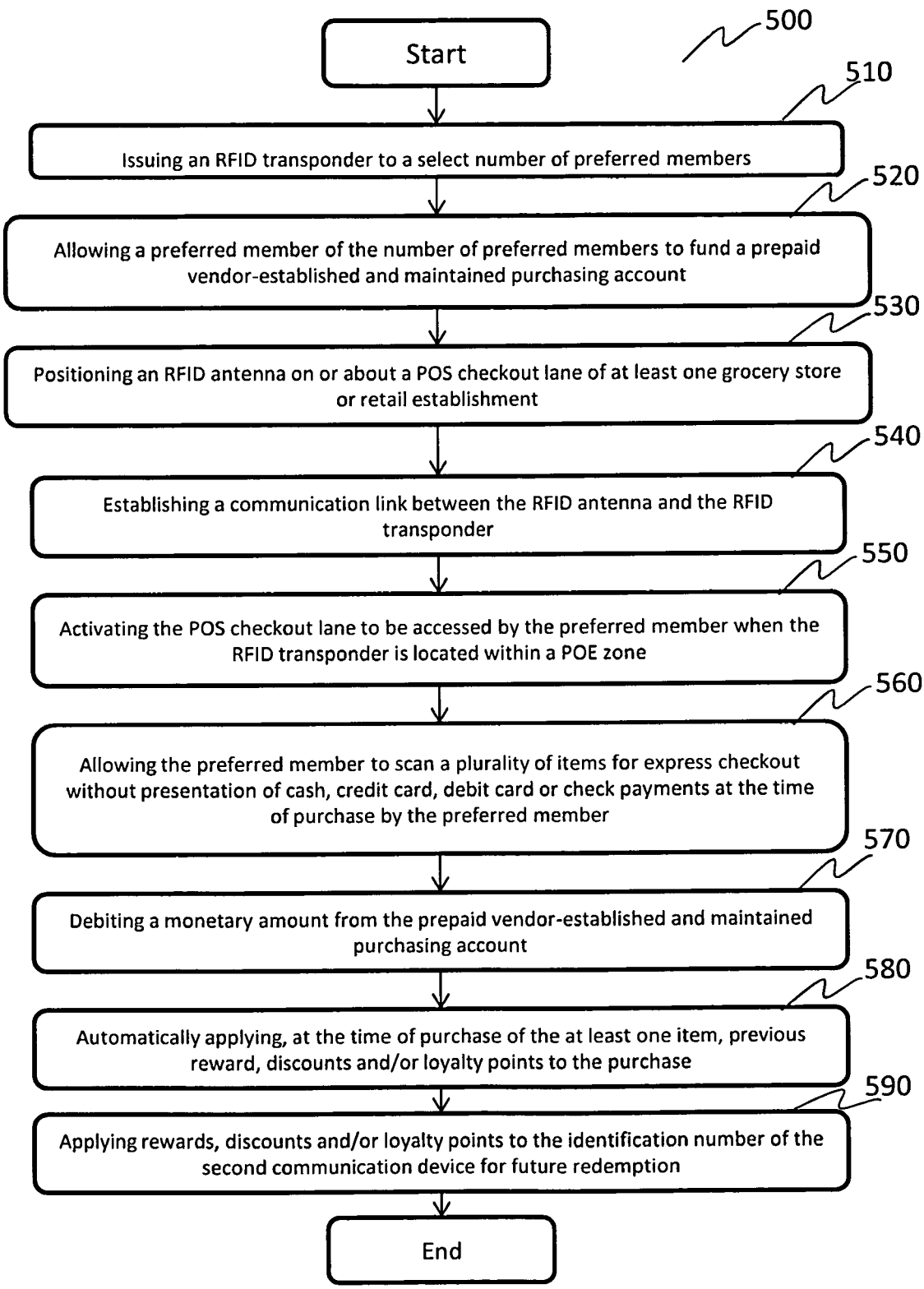
FIG. 5 is a flowchart illustrating activation of a POS checkout lane via a transponder connected to a prepaid vendor-established and maintained purchasing account, and automatically applying previous and future rewards, discounts, loyalty points to an instant transaction, in accordance with the present disclosure.

With reference to FIG. 5, there is presented a flowchart illustrating activation of a POS checkout lane via a transponder connected to a prepaid vendor-established and maintained purchasing account, and automatically applying previous and future rewards, discounts, loyalty points to an instant transaction, in accordance with the present disclosure.

The flowchart 500 includes the following steps. In step 510, an RFID transponder is issued to a select number of preferred members. In step 520, a preferred member of a select number of preferred members is permitted to fund a prepaid vendor-established and maintained purchasing account. In step 530, an RFID antenna is positioned on or about a POS checkout lane of at least one grocery store or retail establishment. In step 540, a communication link is established between an RFID antenna and an RFID transponder. In step 550, the POS checkout lane is activated in order to be accessed by the preferred member when the RFID transponder is located within a POE zone. In step 560, the preferred member is permitted to scan a plurality of items for express checkout without presentation of cash, credit card, debit card or check payments at a time of purchase by the preferred member. In step 570, a monetary amount is debited from the prepaid vendor-established and maintained purchasing account. In step 580, optionally, rewards, discounts, and loyalty points are applied at a time of purchase of the at least one item purchased. In step 590, optionally, additional rewards, discounts, and loyalty points are applied at a time of purchase to the second communication device for future redemption. The process then ends for the first cycle or first iteration. However, the process may be a continuous iterative process. In other words, the steps of the process may repeat for a number cycles or iterations, where at least the issuing, funding, positioning, establishing, activating, scanning, and applying steps are constantly repeated.

Figure 6:
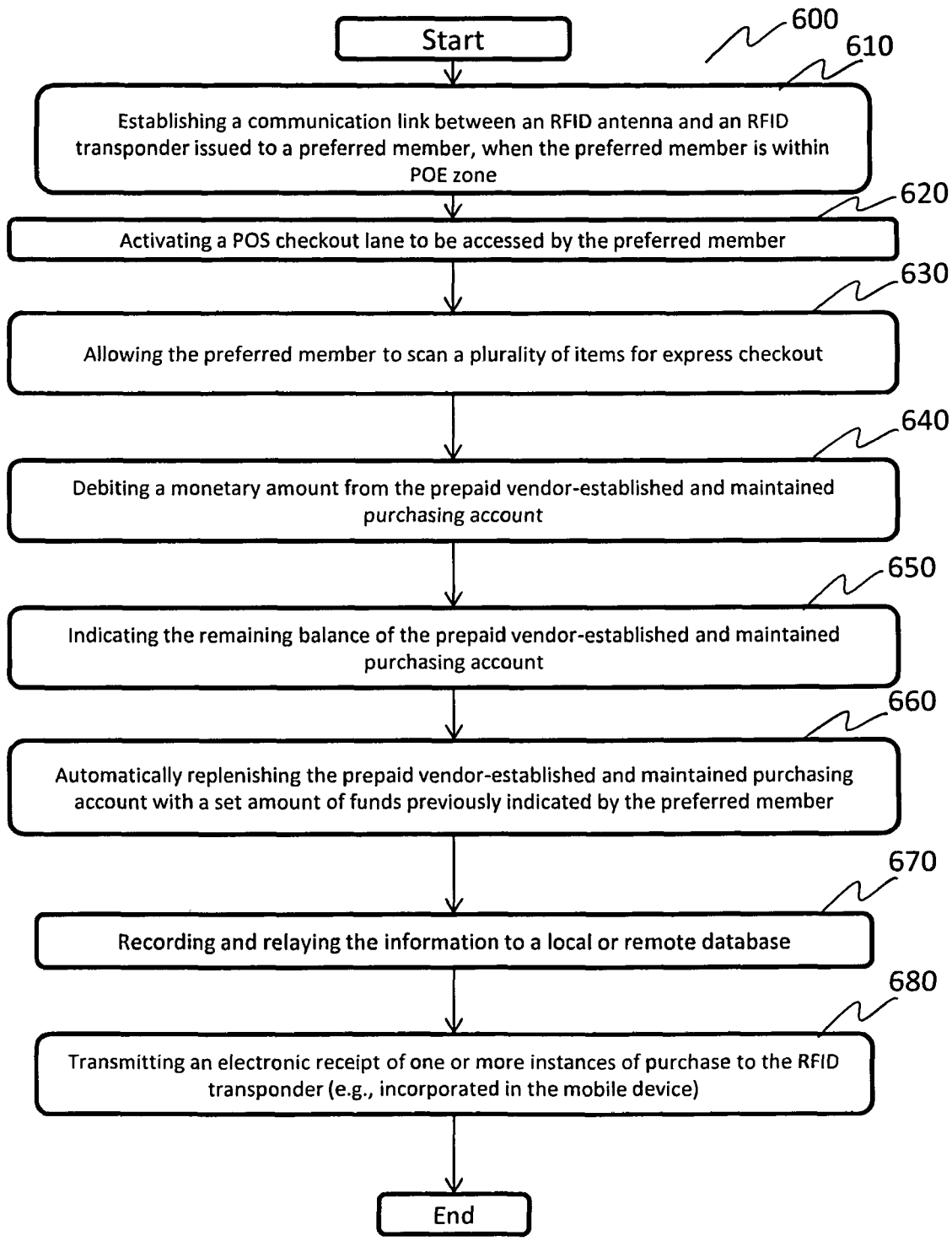
FIG. 6 is a flowchart illustrating activation of a POS checkout lane via a transponder connected to a prepaid vendor-established and maintained purchasing account, indicating a remaining balance, and transmitting an electronic receipt to the transponder, in accordance with the present disclosure.

With reference to FIG. 6, there is presented a flowchart illustrates activation of a POS checkout lane via a transponder connected to a prepaid vendor-established and maintained purchasing account, indicating a remaining balance, and transmitting an electronic receipt to the transponder, in accordance with the present disclosure.

The flowchart 600 includes the following steps. In step 610, a communication link is established between an RFID antenna and an RFID transponder issued to a preferred member, when the preferred member is within a POE zone. In step 620, the POS checkout lane is activated to be accessed by the preferred member. In step 630, the preferred member is permitted to scan a plurality of items for express checkout. In step 640, a monetary amount is debited from the prepaid vendor-established and maintained purchasing account. In step 650, a remaining balance of the prepaid vendor-established and maintained purchasing account indicated. In step 660, the prepaid vendor-established and maintained purchasing account is automatically replenished with a set amount of funds previously indicated by the preferred member. In step 670, the information is recorded and relayed to a local or remote database. In step 680, an electronic receipt of one or more instances of purchase is transmitted to the RFID transponder that may be incorporated with a mobile device. The process then ends for the first cycle or first iteration. However, the process may be a continuous iterative process. In other words, the steps of the process may repeat for a number cycles or iterations, where at least the establishing, activating, scanning, debiting, indicating, replenishing, recording, relaying, storing, and transmitting steps are constantly repeated.

Figure 7:
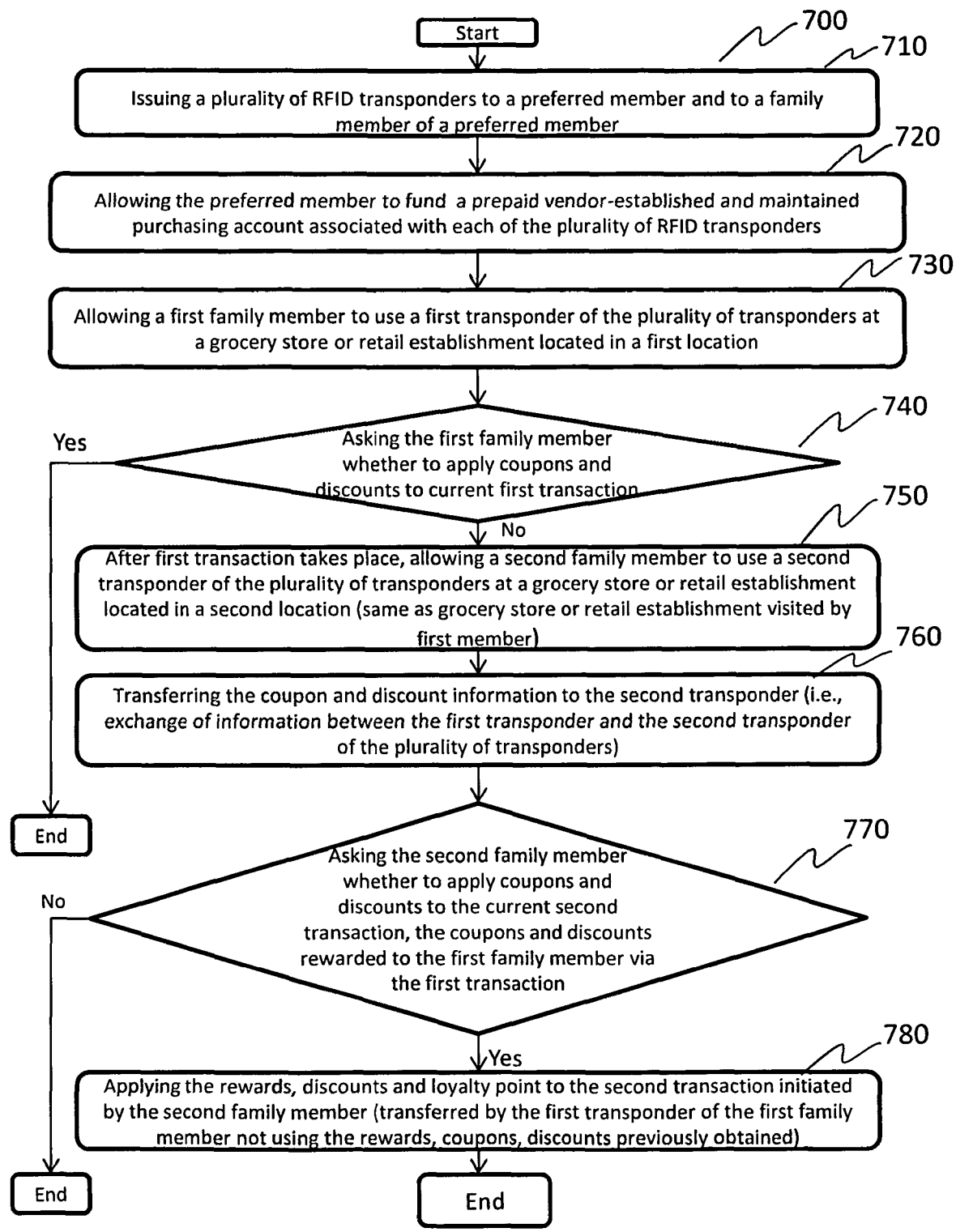
FIG. 7 is a flowchart illustrating exchange of information (e.g., discounts, coupons, rewards, etc.) between a first transponder and a second transponder, where the first and second transponders are associated with the same prepaid vendor-established and maintained purchasing account, in accordance with the present disclosure.

Referring to FIG. 7, a flowchart illustrating exchange of information (e.g., discounts, coupons, rewards, etc.) between a first transponder and a second transponder, where the first and second transponders are associated with the same prepaid vendor-established and maintained purchasing account, in accordance with the present disclosure is presented.

The flowchart 700 includes the following steps. In step 710, a plurality of RFID transponders are issued to a preferred member and family members of the preferred member. In step 720, the preferred member is permitted to fund a prepaid vendor-established and maintained purchasing account associated with each of the plurality of RFID transponders. In step 730, a first family member is permitted to use a first transponder of the plurality of transponders at a grocery store or retail establishment located in a first location. In step 740, the first family member is asked whether he/she wants to apply coupons and discounts to current first transaction. If "YES," the transaction ends. If "NO," the transaction proceeds to step 750. In step 750, after first transaction takes place, a second family member is permitted to use a second transponder of the plurality of transponders at a grocery store or retail establishment located in a second location (same as grocery store or retail establishment visited by first member). In step 760, the coupon and discount information is transferred to the second transponder (i.e., exchange of information between the first transponder and the second transponder of the plurality of transponders). In step 770, the second family member is asked whether he/she wants to apply coupons and discounts to the current second transaction, the coupons and discounts rewarded to the first family member via the first transaction. If "NO," the transaction ends. If "YES," the transaction moves to step 780. In step 780, the rewards, discounts, and loyalty points are selectively applied to the second transaction initiated by the second family member (transferred by the first transponder of the first family member not using the rewards, coupons, discounts previously obtained). The process then ends for the first cycle or first iteration. However, the process may be a continuous iterative process. In other words, the steps of the process may repeat for a number cycles or iterations, where at least the issuing, funding, manipulating, replenishing, recording, relaying, storing, asking, transferring, transmitting, and/or applying steps are constantly repeated.

Figure 8:
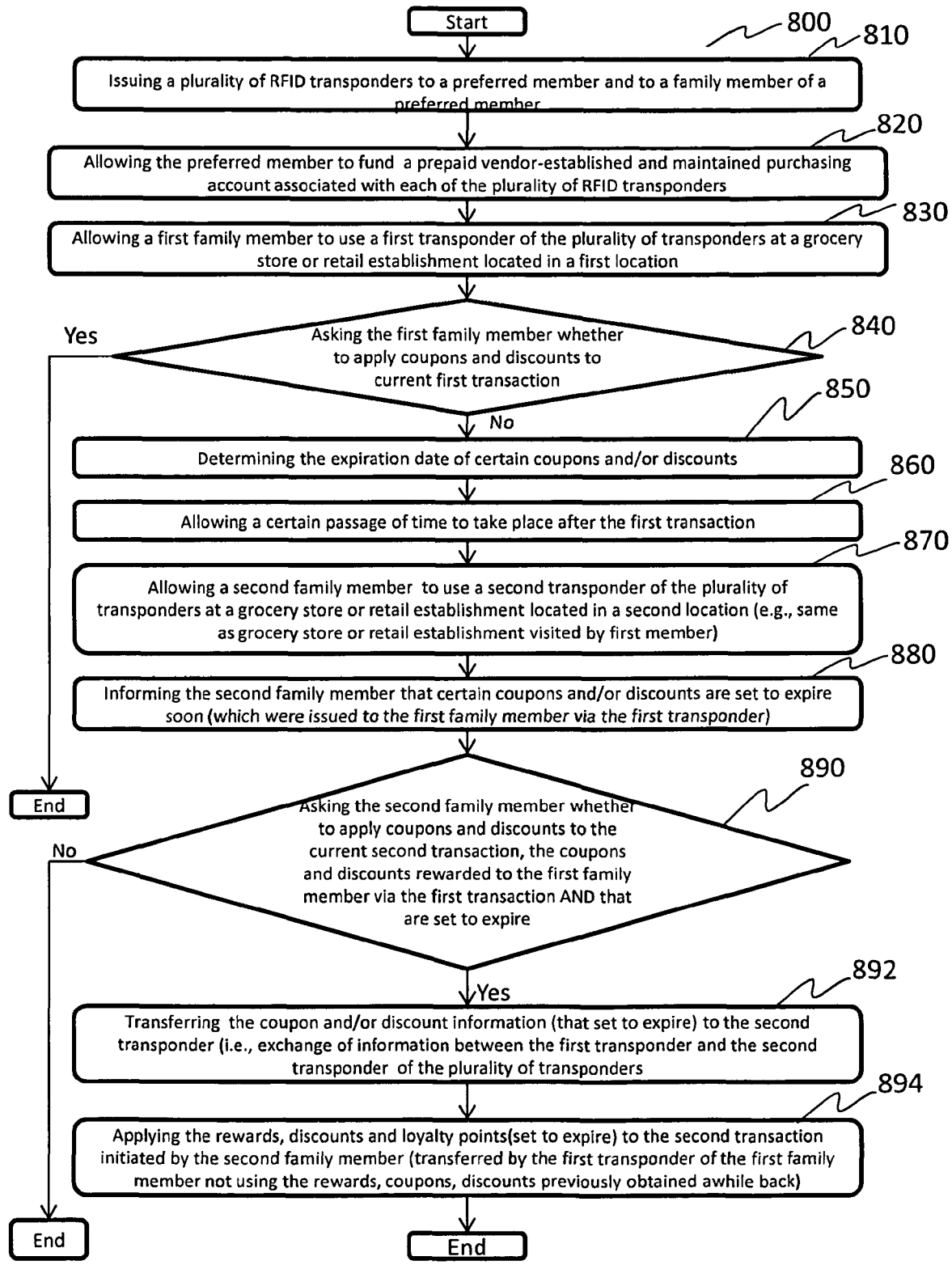
FIG. 8 is a flowchart illustrating exchange of information (e.g., discounts, coupons, rewards, etc.) between a first transponder and a second transponder, where the first and second transponders are associated with the same prepaid vendor-established and maintained purchasing account, and where certain discounts and/or coupons are set to expire, in accordance with the present disclosure.

Referring to FIG. 8, a flowchart illustrating exchange of information (e.g., discounts, coupons, rewards, etc.) between a first transponder and a second transponder, where the first and second transponders are associated with the same prepaid vendor-established and maintained purchasing account, and where certain discounts and/or coupons are set to expire, in accordance with the present disclosure is presented.

The flowchart 800 includes the following steps. In step 810, a plurality of RFID transponders are issued to a preferred member and family members of the preferred member. In step 820, the preferred member is permitted to fund a prepaid vendor-established and maintained purchasing account associated with each of the plurality of RFID transponders. In step 830, a first family member is permitted to use a first transponder of the plurality of transponders at a grocery store or retail establishment located in a first location. In step 840, the first family member is asked whether he/she wants to apply coupons and discounts to current first transaction. If "YES," the transaction ends. If "NO," the transaction proceeds to step 850. In step 850, the expiration date of certain coupons and/or discounts is determined. In step 860, a certain passage of time is permitted to take place after the first transaction. In step 870, a second family member is permitted to use a second transponder of the plurality of transponders at a grocery store or retail establishment located in a second location (e.g., same as grocery store or retail establishment visited by first member). In step 880, the second family member is informed that certain coupons and/or discounts are set to expire soon (which were issued to the first family member via the first transponder). In step 890, the second family member is asked whether he/she wants to apply coupons and discounts to the current second transaction, the coupons and discounts rewarded to the first family member via the first transaction AND that are set to expire. If "NO," the process ends. If "YES," the process proceeds to steps 892. In step 892, the coupon and/or discount information (that are set to expire) is transferred or transmitted to the second transponder (i.e., exchange of information between the first transponder and the second transponder of the plurality of transponders). In step 894, the rewards, discounts, and loyalty points (set to expire) are selectively applied to the second transaction initiated by the second family member (transferred by the first transponder of the first family member not using the rewards, coupons, discounts previously obtained a while back). The process then ends for the first cycle or first iteration. However, the process may be a continuous iterative process. In other words, the steps of the process may repeat for a number cycles or iterations, where at least the issuing, funding, manipulating, replenishing, recording, relaying, storing, asking, transferring, transmitting, and/or applying steps are constantly repeated.

Figure 9:
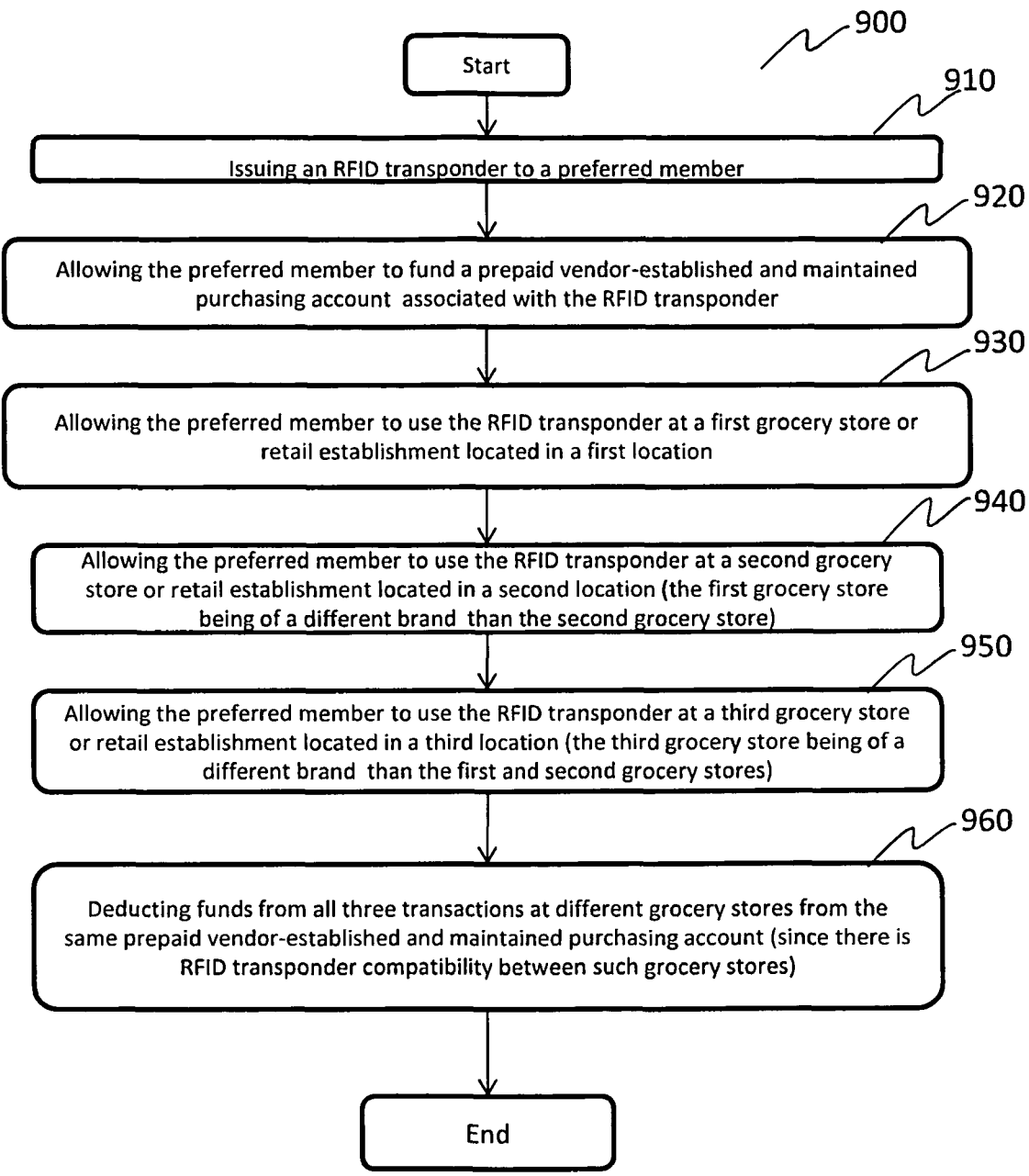
FIG. 9 is a flowchart illustrating a single transponder being compatible with a plurality of E-Z Pass POS express checkout lanes of different stores, as well as store brands, in accordance with the present disclosure.

Referring to FIG. 9, a flowchart illustrating a single transponder being compatible with a plurality of E-Z Pass POS express checkout lanes of different stores, as well as store brands, in accordance with the present disclosure is presented.

The flowchart 900 includes the following steps. In step 910, an RFID transponder is issued to a preferred member. In step 920, the preferred member is permitted to fund a prepaid vendor-established and maintained purchasing account associated with the RFID transponder. In step 930, the preferred member is permitted to use the RFID transponder at a first grocery store or retail establishment located in a first location. In step 940, the preferred member is permitted to use the same RFID transponder at a second grocery store or retail establishment located in a second location (the first grocery store being of a different brand than the second grocery store). In step 950, the preferred member is permitted to use the same RFID transponder at a third grocery store or retail establishment located in a third location (the third grocery store being of a different brand than the first and second grocery stores). In step 960, funds are deducted from all three transactions at different grocery stores from the same prepaid vendor-established and maintained purchasing account (since there is an RFID transponder compatibility between such grocery stores). The process then ends for the first cycle or first iteration. However, the process may be a continuous iterative process. In other words, the steps of the process may repeat for a number cycles or iterations, where at least the issuing, funding, deducting, manipulating, replenishing, recording, relaying, storing, asking, transferring, transmitting, and/or applying steps are constantly repeated.

In an alternative embodiment, the transponder may come in many different shapes and sizes. The transponder may be incorporated into any type of electronic device or mobile device or apparel or clothing of the consumer. It will be appreciated that various embodiments of transponders may be employed in a variety of applications and, accordingly, variables including, but not limited to, the geometry defined by the transponder and its components therein, as well as the size of the transponder may be varied either alone or in various combinations as required to suit a particular application and/or to facilitate achievement of one or more desired results.

In another alternative embodiment, items scanned by the checkout clerk or preferred member are automatically tracked for providing present, as well as future discounts or coupons related to the items purchased or similar items. Therefore, there is no need to carry coupons since coupons and discounts will be applied automatically at each transaction activated at the E-Z Pass express checkout lane. Any coupons circulated by the grocery store will be automatically applied to E-Z Pass express checkout lane transactions without the need to slow down the lanes with the presentation of paper coupons. The grocery store and/or retail establishment is in a position to automatically offer such coupons or discounts because of the "float" described above. The "float" may be invested in other ventures in order to permit the savings to be passed on to the customers or consumers, automatically and in real-time, as each purchasing transaction takes place.

In another alternative embodiment, the transponder may be a virtual transponder associated with a mobile device. The virtual transponder may be an app enabled to be used on any type of mobile devices and networks (e.g., iPhone®, Android®, Blackberry®, etc.). Thus, no physical transponder needs to be presented at the POS express checkout lane, only a mobile device having downloaded the virtual transponder app.

In another alternative embodiment, the predetermined amount to be replenished need not be set as the same amount every cycle. For example, a consumer may determine that he/she purchases more items from a grocery store and/or retail establishment during certain periods of time. For example, a consumer may purchase more items in the summer since the kids are back from college or more parties are thrown during this time period. As such, the consumer may designate a $700/month budget for items during June, July, and August and designate $400/month budget for September, October, and November. In December, the consumer may decide to increase the budget to $900 for that month (e.g., Christmas holidays). Therefore, a consumer is permitted to provide a vendor with variable funds every month on a preset or predetermined basis at the consumer's convenience.

In another exemplary embodiment, the RFID transponders or tags may communicate with each other or exchange information with each other, as described with reference to FIGS. 7 and 8 above. For example, a grocery store may issue, for instance, three RFID transponders to a single family. One to the father, one to the mother, and one to the children. As such, each may be able to use the same prepaid vendor-established and maintained purchasing account. The father may work in Manhattan, whereas the mother may work in Long Island. The child may go to college in Massachusetts. All three locations (i.e., Manhattan, Long Island, and Massachusetts) may have a common store (e.g., Rite Aide). Each user may have a transponder to use at a Rite Aid® in each location. All the purchase information may be exchanged between the transponders.

For example, the mother may have purchased $300 worth of items. The list of items purchased may be relayed to a local or remote database or server or may be relayed to the transponders of the father and child or may be relayed to any mobile device or computing device utilized by the father and child. Additionally, the mother may have deferred the use of coupons for a future transaction. As such, the father or child may utilize such coupons or discounts rewarded to the mother for one of their future transactions. In other words, the coupons or discounts may be transferred between transponders issued to a same household or family. Additionally, it is contemplated that this methodology may work for the same location only. In other words, the father may have to use the same Rite Aid® in Long Island as used by the mother in order to receive the discounts previously provided to the mother. Of course, this depends on store policies of transferring coupons and/or discounts and/or rewards. Moreover, such relationships may be established between relatives or friends, as grocery stores and/or retail establishments see fit. In other words, for example, a group of five friends may receive transponders linked to a common purchasing account. The purchases made by one member of the group may results in savings or coupons or discounts to another member of that group. Thus, discounts or coupons or rewards may be easily transferred from transponder to transponder (or preferred member to preferred member).

In another alternative embodiment, a single transponder may be compatible with a plurality of grocery stores and retail establishments as described with reference to FIG. 9 above. For example, a single transponder may be used at two grocery stores that the customer frequents (e.g., Kroger® and Costco®). As another example, the single transponder may be compatible with a grocery store and a retail establishment (e.g., Pathmark® and The Gap®). The single transponder may be compatible with any number of stores or combination of stores as desired by a preferred member or as indicated by certain grocery stores and/or retail establishments.

For example, a first grocery store may exclude a preferred member from associating a second grocery store with the same transponder received from the first grocery store, as such grocery stores directly compete against each other. However, the first grocery store may permit a second grocery store with a second transponder only if such second grocery store is located outside a predetermined distance of the first store. For example, if the second grocery store is at least 10 miles away (or outside a 10 mile diameter) from the first grocery store. In other words, one retailer or grocery store may exclude the compatibility of a single transponder with one or more other retailers or grocery stores. However, it is contemplated, that retailers and/or grocery stores may encourage the sharing of a transponder between certain stores, especially if such stores are in involved in merchandise partnerships. For instance, Best Buy® may develop a partnership with a grocery store or retail establishment, with mutually exclusive sales items.

In another exemplary embodiment, as described above with reference to FIG. 8, the RFID transponders may automatically transfer discounts, coupons, loyalty points to other RFID transponders of the same family of transponders when certain discounts, coupons, loyalty points are set to expire by the grocery store or retail establishment. In other words, if a first preferred member of a family of preferred members having an RFID tag associated with or corresponding to the same prepaid vendor-established and marinated purchasing account does not use his/her RFID tag in a while, coupons and/or discounts and/or rewards accumulated on such tag may be transferred to another tag of a second preferred member of the family of preferred members.

At least one advantage of the present exemplary express purchasing systems is that the grocery stores and/or retail establishments receive money upfront. Additionally, such grocery stores or retail establishments will most likely receive more money upfront than what the consumer intends to spend in a few transactions. In other words, in most instances, the cash flow coming in will be greater than the products exiting the store (at least for preferred members). As such, a "float" should always be present with each consumer or preferred member. At least another advantage of the present exemplary express purchasing systems is that the "float" permits the grocery stores or retail establishments to invest "excess" funds in any way they see fit in order to earn an interest on such funds. This accumulated interest may be passed on to the preferred customers or members in the form of instant discounts or rewards or coupons or loyalty points or a combination thereof, administered in real-time at the E-Z pass checkout lane (if desired to be redeemed by the preferred member in the instant transaction).

At least another advantage of the present exemplary express purchasing systems is that the grocery stores and/or retail establishments is that preferred members are only permitted to use such E-Z Pass POS express checkout lanes. These express checkout lanes are not activated for everyone entering the store. Thus, selective activation of lanes based on preferred membership linked to prepaid vendor-established and maintained purchasing accounts enables faster checkout and less hassles. Additionally, there is no need for couponing (no more extreme couponing that consumes enough hours a week to make it a full-time job with tons of overtime) as coupons circulated by the grocery store via circulars or the Internet are automatically applied, no questions asked.

Alternatively, a separate kiosk may be provided at the grocery store or retail establishment (either indoors or outdoors) to permit interaction with potential preferred members or current preferred members. The kiosk may allow the current preferred member to add more funds to the prepaid vendor-established and maintained purchasing account. Alternatively, a vending machine may be provided at the grocery store or retail establishment (either indoors or outdoors) to permit interaction with potential preferred members or current preferred members. The vending machine may allow the current preferred member to add more funds to the prepaid vendor-established and maintained purchasing account. These kiosks or vending machines may be used exclusively by preferred members for preferred member transactions.

Thus, a kiosk associated with a grocery store or retail establishment easy-pass (E-Z) lane system for enabling express non-contact payment of a plurality of items may be presented, where the kiosk includes an input means for inputting commands related to funding a prepaid vendor-established and maintained purchasing account. The kiosk may allow the preferred member to purchase at least one transponder or tag or smart tag associated with a plurality of members (same family or friends) or a plurality of grocery stores and/or retail establishments. Additionally, a vending machine may operate in a similar manner.

Another advantage of the present exemplary express purchasing systems is that the express lanes are exclusive to preferred members. If a regular customer approaches the E-Z Pass lane and attempts to scan items, the E-Z Pass express checkout lane is not activated or is non-operational because it cannot detect an issued transponder to be authenticated. The E-Z pass lane will not accept such customer and will remain disabled. Thus, the E-Z pass lane itself is selective and exclusive in nature.

In summary, a one-step proximity shopping system is presented. A proximity activation system is presented for permitting payments of goods, items and/or products at grocery stores and/or retail establishments. The proximity activation system enables an express checkout lane to be activated only by preferred members who have a pre-registered, prepaid vendor-established and maintained purchasing account. The prepaid vendor-established and maintained purchasing account is indirectly associated with a user's personal banking or credit accounts. The transponders described herein are used for non-transport systems, such as grocery stores and/or retail establishments (as opposed to E-Z pass toll lanes on highways). The transponders described herein also do not relate to fixed fees for passing through a lane. In contrast, the fee charged varies for each transaction and passing of the lane because it is associated with the purchase price of the items purchased (and the number of items purchased during each transaction). There is no automatic collection of a fixed or set fee for each pass (as opposed to E-Z pass toll lanes on highways).

Additionally, when implemented via executable instructions, various elements of the present disclosure are in essence the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

The computer means or computing means or processing means may be operatively associated with the assembly, and is directed by software to compare the first output signal with a first control image and the second output signal with a second control image. The software further directs the computer to produce diagnostic output. Further, a means for transmitting the diagnostic output to an operator of the verification device is included. Thus, many applications of the present disclosure could be formulated. The exemplary network disclosed herein may include any system for exchanging data or transacting business, such as the Internet, an intranet, an extranet, WAN (wide area network), LAN (local area network), satellite communications, and/or the like. It is noted that the network may be implemented as other types of networks.

In this description and in the following claims, a "computer system" or 'computing means" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile device or Personal Digital Assistant "PDA") where internal modules (such as a memory and processor) work together to perform operations on electronic data.

Additionally, "code" as used herein, or "program" as used herein, may be any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more transponder recognition and collection systems or servers to operate one or more processors to run the transponder recognition algorithms. Moreover, computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types.

A service provider may be any entity that develops, offers, controls, manages, owns, alters and/or sells software and/or hardware products and/or items or products or publications. A service provider may be any entity that performs one or more tasks on one or more pre-existing transponder systems, which may or may not be controlled or owned by the service provider. For example, the entity may offer a service with an existing software package and/or with any type of existing Internet-based service through the Internet. In other words, a service provider need not own or provide the transponder systems. The transponder systems may be owned or provided by any third party not related or associated with the service provider (e.g., grocery store or retail establishment). In the present disclosure, it may be contemplated that the entity (such as a service provider) may offer any type of service and/or product to optimize pre-existing, pre-owned transponder systems by referring potential customers to an Internet website or a store that may or may not be associated with transponder system-related services and/or products. The term "entity" may refer to anything that may exist as a discrete and/or distinct unit that owns, operates, manages, and/or controls one or more of a plurality of machines (such as tags). For example, the term "entity" may include the term "company." Thus, the exemplary embodiments of the present disclosure also cover service providers of smart tag systems and methods.

Those skilled in the art will appreciate that the present disclosure may be practiced in computer network environments with many types of computer system configurations, including, personal computers, laptop computers, hand-held devices, multi-processor systems, network PCs, minicomputers, mainframe computers, kiosks, computerized fuel dispensers, PDAs, and the like. The present disclosure may also be practiced in distributed system environments where local and remote computer systems, which are linked (either by hardwired data links, wireless data links, or by a combination of hardwired and wireless data links) through a computer network, both perform tasks. In a distributed system environment, program modules may be located in both local and remote memory storage devices.

It will be understood that there are to be no limitations as to the dimensions and shape of the transponder systems, including the storage compartment, or the materials from which the transponder systems are manufactured or the electronics that may be used to run such a transponder system and/or scanners (e.g., one or more biomaterials and/or biochips and/or gel biochips and/or biosensors and/or bio-electronic sensors and/or microprocessors).

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

It should be noted that the language used in the specification has been principally selected for readability and instructional purposes, and may not have been selected to delineate or circumscribe the inventive subject matter. Accordingly, the disclosure is intended to be illustrative, but not limiting, of the scope of the present disclosure.

Having described the present disclosure above, various modifications of the techniques, procedures, materials and equipment will be apparent to those in the art. It is intended that all such variations within the scope and spirit of the appended claims be embraced thereby.

The foregoing examples illustrate various aspects of the present disclosure and practice of the methods of the present disclosure. The examples are not intended to provide an exhaustive description of the many different embodiments of the present disclosure. Thus, although the foregoing present disclosure has been described in some detail by way of illustration and example for purposes of clarity and understanding, those of ordinary skill in the art will realize readily that many changes and modifications may be made thereto without departing form the spirit or scope of the present disclosure.

What is claimed is:

1. An expedited purchasing system, comprising:
  a first communication device fixedly positioned on or about a point-of-sale (POS) checkout lane of at least one of a grocery store or a retail establishment or a combination thereof; and
  a second communication device being a portable device provided to at least one preferred and pre-registered member by the at least one of the grocery store or the retail establishment or the combination thereof once the at least one preferred and pre-registered member applies for and finds a prepaid vendor-established and maintained purchasing account established for the at least one preferred and pre-registered member by the at least one of the grocery store or the retail establishment or the combination thereof, the second communication device activated thereafter to be handled by the preferred and pre-registered member, the second communication device further associated with unique identification information including at least an identification number and the prepaid vendor-established and maintained purchasing account;
  wherein, when the second communication device is introduced within a point-of-entry (POE) zone by the at least one preferred and pre-registered member, the POE zone defined as a region in proximity to and including the POS checkout lane, and verified as an authorized device by the first communication device, the first communication device triggers activation of the POS checkout lane in response to the verification to enable (i) at least one item of a plurality of items available for purchase to be scanned directly by the at least one preferred and pre-registered member via a scanner at the POS checkout lane and located in the POE zone, and activated in conjunction therewith, and (ii) to enable express purchasing checkout of the at least one item of the plurality of items available for purchase by the at least one preferred and pre-registered member without acceptance of cash, credit card, debit card, or check at the POS checkout lane such that payment at the POS checkout lane is only debited automatically from the prepaid vendor-established and maintained purchasing account that is indirectly associated with a personal account of the at least one preferred and pre-registered member; and
  wherein when a monetary amount of the prepaid vendor-established and maintained purchasing account reaches a predetermined threshold, the prepaid vendor-established and maintained purchasing account is automatically replenished with a set amount of funds previously indicated by the at least one preferred and pre-registered member.

2. The expedited purchasing system according to claim 1, wherein the first communication device is a Radio Frequency Identification Device (REID) antenna and the second communication device is an REID transponder.

3. The expedited purchasing system according to claim 1, wherein boundaries of the POE zone are established by one or more characteristics of the first communication device.

4. The expedited purchasing system according to claim 1, wherein the POS checkout lane is configured to debit a monetary amount from the prepaid vendor-established and maintained purchasing account, the monetary amount debited associated with the at least one of item purchased by the at least one preferred and pre-registered member.

5. The expedited purchasing system according to claim 1, wherein the POS checkout lane or the second communication device is configured to indicate at least a remaining balance of the prepaid vendor-established and maintained purchasing account.

6. The expedited purchasing system according to claim 1, wherein information related to the at least one item scanned at the POS checkout lane by the at least one preferred and pre-registered member is recorded and relayed to a local or remote storage unit.

7. The expedited purchasing system according to claim 1,
  wherein previous rewards, discounts and loyalty points are automatically applied to the purchase of the at least one item; and
  wherein additional rewards, discounts, and loyalty points are applied to the identification number of the second communication device for future redemption.

8. The expedited purchasing system according to claim 1, wherein the second communication device is a mobile device incorporating an RFID transponder, the mobile device configured to at least record transactions of instances of purchase.

9. The expedited purchasing system according to claim 8, wherein an electronic receipt of transactions of instances of purchase is transmitted to the RFD transponder incorporated with the mobile device at a time of purchase, such that the RFID transponder is configured to transmit the electronic receipt to a computing device.

10. The expedited purchasing system according to claim 1, wherein the POS checkout lane exclusively accepts only one form of payment initiated from the second communication device.

11. A method of purchasing at least one item, the method comprising:
  issuing a first communication device to at least one preferred and pre-registered member by at least one of a grocery store or a retail establishment or a combination thereof once the at least one preferred and pre-registered member applies for and funds a prepaid vendor-established and maintained purchasing account;
  establishing the prepaid vendor-established and maintained purchasing account associated with the first communication device issued to the at least one preferred and pre-registered member by the at least one of the grocery store or the retail establishment or the combination thereof;
  activating the first communication device thereafter to be handled by the preferred and pre-registered member;
  establishing wireless communication between the first communication device and a second communication device when the first and second communications devices are in proximity to each other, the second communication device fixedly positioned on or about a POS checkout lane of at least one of a grocery store or a retail establishment or combination thereof, the second communication device introduced within a point-of-entry (POE) zone by the at least one preferred and pre-registered member, the POE zone defined as a region in proximity to and including the POS checkout lane;

triggering activation of the POS checkout lane via the first communication device after verification and authorization of the wireless communication;

in response to activation of the POS checkout lane, (i) enabling the at least one item available for purchase to be scanned directly by the at least one preferred and pre-registered member via a scanner at the POS checkout lane and located in the POE zone, and activated in conjunction therewith, and (ii) enabling express purchasing checkout of the at least one item available for purchase by the at least one preferred and pre-registered member without acceptance of cash, credit card, debit card, or check at the POS checkout lane such that payment at the POS checkout lane is only debited automatically from the prepaid vendor-established and maintained purchasing account that is indirectly associated with a personal account of the at least one preferred and pre-registered member; and automatically replenishing the prepaid vendor-established and maintained purchasing account when a monetary amount of the prepaid vendor-established and maintained purchasing account reaches a predetermined threshold, replenishing occurring with a set amount of funds previously indicated by the at least one preferred and pre-registered member.

12. The method according to claim 11, wherein the first communication device is an RFID transponder and the second communication device is an RFID antenna.

13. The method according to claim 11, further comprising debiting a monetary amount from the prepaid vendor-established and maintained purchasing account associated with the at least one item purchased by the at least one preferred and pre-registered member.

14. The method according to claim 11, further comprising indicating a remaining balance of the prepaid vendor-established and maintained purchasing account at the POS checkout lane or at the first communication device.

15. The method according to claim 11, further comprising collecting information related to the at least one item purchased to enable the at least one grocery store or retail establishment to provide future discounts, rewards, and loyalty points to the at least one preferred and pre-registered member.

16. The method according to claim 15, further comprising recording and relaying the information collected to a local or remote storage unit.

17. The method according to claim 11, further comprising the steps of:

automatically applying previous rewards, discounts and loyalty points to the purchase of the at least one item; and applying additional rewards, discounts, and loyalty points to the identification number of the second communication device for future redemption.

18. The method according to claim 11, further comprising exclusively accepting only one form of payment at the POS checkout lane that is initiated from the second communication device.

19. A system for authorizing transponder-enabled transactions, the system comprising:

a communication link between (i) an RFID antenna positioned on or about a POS checkout lane of at least one of a grocery store or a retail establishment or combination thereof and (ii) are RFID transponder provided to at least one preferred and pre-registered member by the grocery store or retail establishment or the combination thereof once the at least one preferred and pre-registered member applies for and funds the prepaid vendor-established and maintained purchasing account;

wherein the RFID transponder is activated thereafter to be handled by the at least one preferred and pre-registered member;

wherein, after the communication link is activated when the RFID transponder is introduced within a POE zone by the at least one preferred and pre-registered member, the POE zone defined as a region in proximity to and including the POS checkout lane, the POS checkout lane is triggered to be activated in response to activation of the communication link, and accessible to the at least one preferred and pre-registered member for enabling (i) the at least one preferred and pre-registered member to directly scan a plurality of items for purchase, via a scanner, activated in conjunction with activation of the communication link, and (ii) enabling express purchasing checkout of the plurality of items available for purchase without acceptance of cash; credit card, debit card, or check at the POS checkout lane such that payment at the POS checkout lane is only debited automatically from the prepaid vendor-established and maintained purchasing account that is indirectly associated with a personal account of the at least one preferred and pre-registered member;

wherein previous rewards, discounts and loyalty points are automatically applied at the time of purchase of the plurality of items; and wherein when a monetary amount of the prepaid vendor-established and maintained purchasing account reaches a predetermined threshold, the prepaid vendor-established and maintained purchasing account is automatically replenished with a set amount of funds previously indicated by the at least one preferred and pre-registered member.

20. The system according to claim 17, wherein an electronic receipt of purchase is transmitted to the RFID transponder at the time of purchase; and wherein the RFID transponder is a mobile device that is configured to transmit the electronic receipt to a computing device.

* * * * *